Patented June 8, 1937

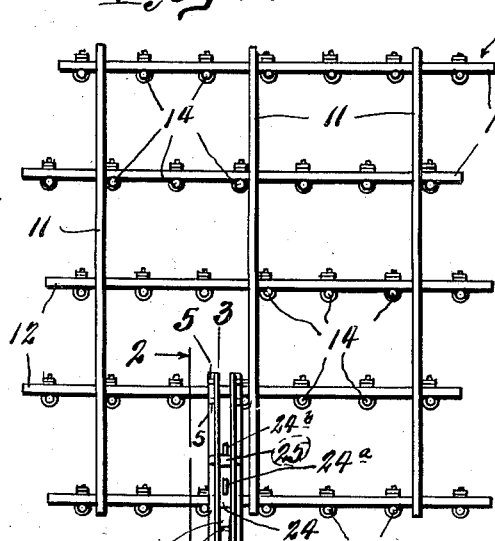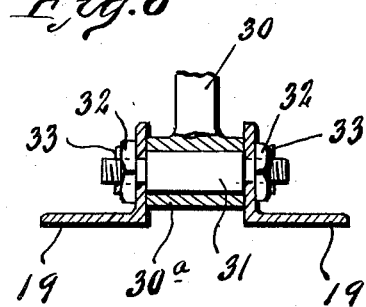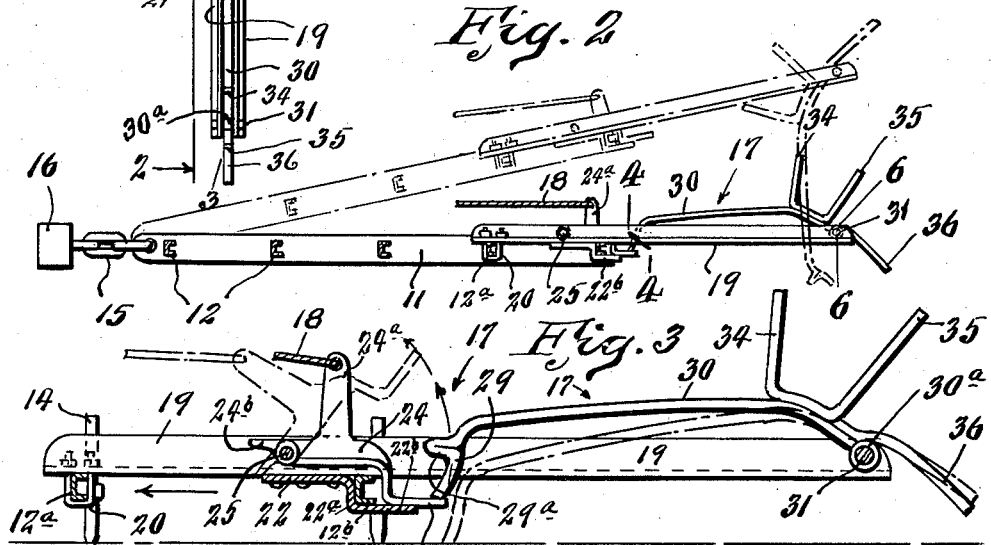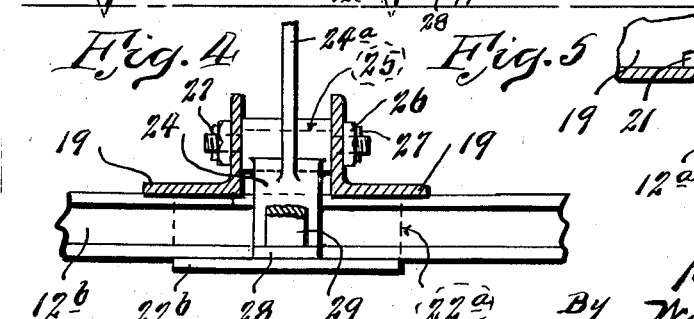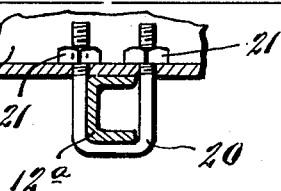

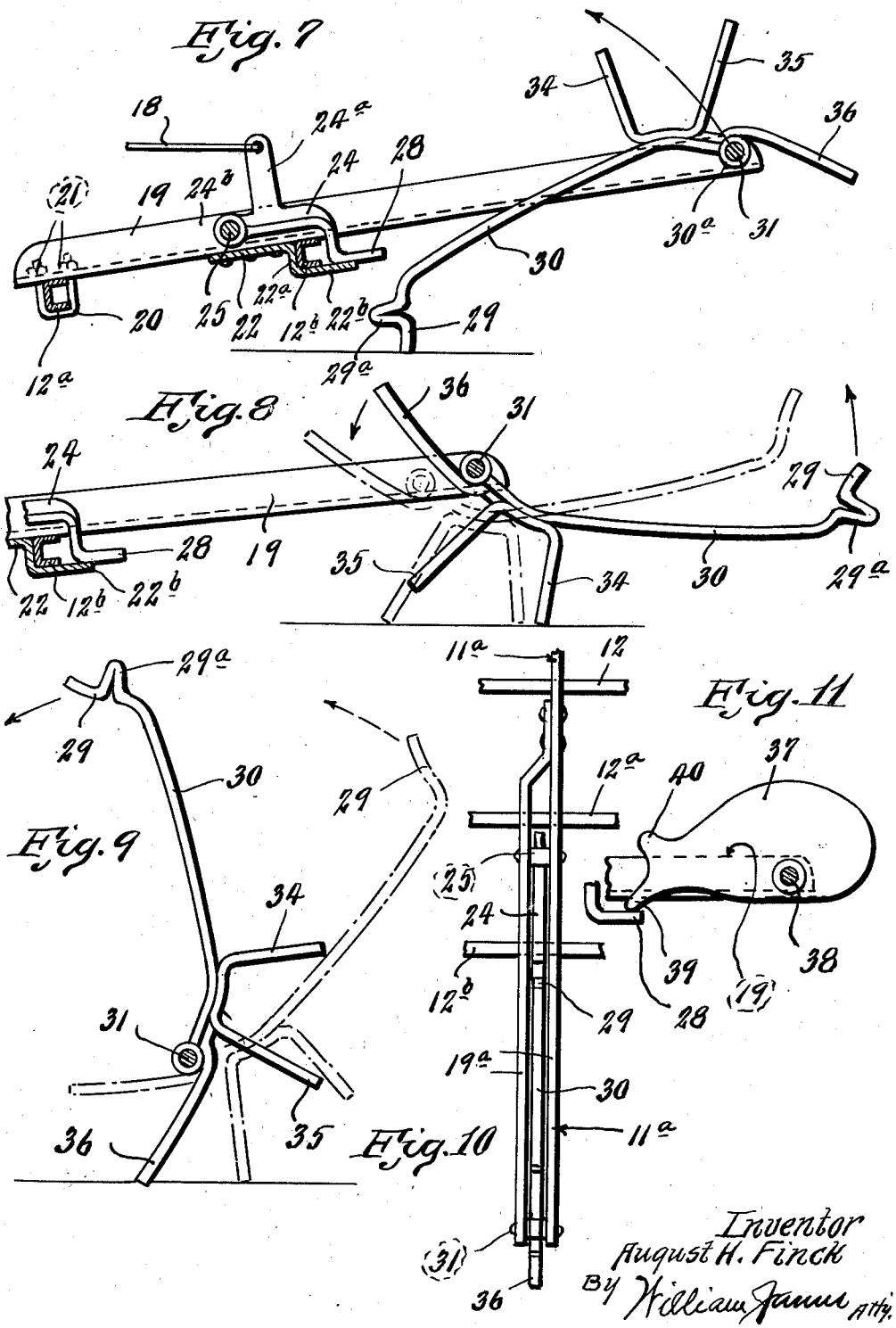

2,082,795

UNITED STATES PATENT OFFICE 2,082,795

HARROW TRIPPER

August H. Finck, St. Charles, Mo.

Application May 16, 1935, Serial No. 21,715

6 Claims. (Cl. 55—34)

This invention relates to new and useful improvements in harrows.

In harrowing a field, the teeth of the harrow collects roots, corn stalks, and similar trash, and it is necessary at suitable intervals to clear the harrow teeth of this material. To accomplish this the operator has to leave his seat and walk back of the harrow and raise it off the ground a sufficient distance to bring the teeth clear of the trash. This not only wastes time but also requires the operator to perform heavy work of lifting the harrow a number of times at each harrowing operation.

One of the main objects of the invention is the provision of a harrow which at the will of the operator can be automatically raised from the ground a sufficient distance to release the harrow teeth from the trash accumulated during the operation, without requiring the operator to leave his seat or his regular position, and without stopping the harrowing operation.

Other objects of the invention are to provide a harrow having means controlled by the operator and automatically operable to raise the harrow off the ground to bring the harrow teeth away from the roots, stalks and similar matter collected by the harrow.

Another object of the invention is the provision of a tripper for harrows, said tripper being adapted to be readily attached to existing types of harrows without requiring any structural changes in the latter or the services of a skilled mechanic.

Additional objects of the invention are to provide a tripping device for harrows which is of simple and durable construction, can be easily operated, and is inexpensive to manufacture.

With these and other objects in view, my invention consists in certain novel features of construction and arrangement of parts, hereinafter more fully described and claimed, and illustrated in the accompanying drawings, in which—

Figure 1 is a top plan view of a harrow equipped with my improved tripper.

Figure 2 is a longitudinal cross section taken on line 2—2 of Figure 1.

Figure 3 is an enlarged cross section taken on line 3—3 of Figure 1.

Figure 4 is an enlarged cross section taken on line 4—4 of Figure 2.

Figure 5 is an enlarged cross section taken on line 5—5 of Figure 1.

Figure 6 is an enlarged cross section taken on line 6—6 of Figure 2.

Figure 7 is a view similar to Figure 3 but showing the tripping arm in released position.

Figure 8 is a similar view showing the tripping arm in rearwardly extending position.

Figure 9 is a similar view showing the tripping arm in upward position.

Figure 10 is a fragmental top plan view showing a modified form of a tripper.

Figure 11 is a sectional view showing a modified form of a tripper arm.

Referring by numerals to the accompanying drawings, 10 indicates a harrow section which can be of any usual construction and consists of a series of longitudinal bars 11 and a plurality of tooth bars 12 disposed transversely in spaced-apart relation with each other and mounted in said longitudinal bars 11. There are usually three of the longitudinal bars 11, namely, two end bars and one intermediate bar. Each tooth bar 12 has fixed thereon a plurality of downwardly presented spaced-apart teeth or spikes 14 which work the ground as the harrow is pulled forwardly. These teeth may be disposed vertically for deep work as shown in the drawings or they may slant rearwardly for smoothing the seed bed and the like. The forward ends of bars 11 are connected by chain links 15 to a draw bar 16 to which a team or tractor is attached in the usual manner.

Heretofore, the operator had to stop the harrowing operation at frequent intervals in order to clear the harrow teeth of trash, such as weeds, roots, stalks, and the like, which accumulate against the teeth. The common practice in clearing the harrow teeth of the trash is to lift each harrow section and move it forward past the accumulated material. Sometimes the harrow section has to be shaken to release the trash attached to the teeth.

In the present invention a tripping device 17 is provided which automatically raises each harrow section without interrupting the harrowing operation. This tripping device can be set in operation by the driver by pulling on a cable or cord 18 which runs from the tripping device 17 to the seat of the driver.

In Figures 1 to 9 is shown a tripping device which can be attached to existing types of harrows. It includes a pair of angle bars 19 spaced a suitable distance from each other and disposed longitudinally of the harrow section. The forward ends of these bars 19 are attached to the last two tooth bars 12a and 12b, respectively, and said angle bars 19 extend a suitable distance rearwardly of the harrow section.

The angle bars 19 are fastened to the tooth bar 12a by U-shaped bolts 20, each of which extends under the tooth bar 12a and has its ends projecting upwardly through apertures formed in the horizontal flange of each bar 19. The ends of these U-shaped bolts are screw-threaded and receive nuts 21 which draw said U-shaped bolts against the tooth bar 12a and secure the angle bars to the latter.

A plate 22 is secured to the undersides of the horizontal flanges of both angle bars 19 forwardly of tooth bar 12b. The plate 22 is formed with a shoulder 22a and with a rearwardly presented end or ledge 22b. The shoulder 22a bears against the forwardly presented side of tooth bar 12b and the horizontally disposed ledge 22b bears against the underside of said tooth bar 12b and extends a suitable distance rearwardly past the same. Thus the angle bars 19 are securely attached to the tooth bars 12a and 12b by said U-shaped bolts 20 and plate 22.

Due to the large surface bearing of plate 22 with the tooth bar 12b the angle bars 19 are held against side-sway and said plate 22 transfers the pulling strain from the tooth bars to the angle 19, thereby relieving the U-shaped bolts of undue strain.

A lever 24 is pivotally mounted at its rear end between angles 19 by means of a pin 25. This pin extends between the vertical flanges of angles 19 and has reduced ends which extend through said flanges and receives nuts 26 and cotter pins 27 which latter lock the nuts in position.

The rear end of the lever 24 extends slightly past the rear edge of the plate 22, as indicated at 28, and forms a rest for the forward end 29 of a tripper arm 30. This arm is revolubly mounted between the rear ends of angle members 19 by a pin 31, the ends of which are secured to the vertical flanges of said angles by nuts 32 and cotter pins 33.

The arm 30 is preferably formed with a tubular portion 30a which provides a large bearing on pin 31 for said arm and maintains the latter in proper alignment with the lever 24 and the angle members 19.

The forward end 29 of arm 30 is preferably inclined from vertical so that the extremity of said end is in advance of said arm.

A plurality of outwardly projecting fingers or lugs 34, 35 and 36 is fixed to said arm 30 adjacent to the pivotal rear end thereof. These fingers are spaced apart from each other with respect to the axis of said mounting, finger 34 being disposed forwardly of the pivotal mounting 31, while the outer end of finger 35 is disposed rearwardly and upwardly and finger 36 is presented rearwardly and downwardly.

The arm 24 is provided with an upward extension 24a to which one end of the cable 18 is attached. When this cable is pulled, arm 24 is rocked on its pivotal mounting 25 and is moved upwardly as shown in dotted lines in Figure 3. This releases the arm 30 so that the latter drops into the position in dotted lines in said figure.

Normally the tripping device occupies position shown in full lines in Figures 2 and 3. In this position the forward end 29 of arm 30 rests on end 28 of lever 24 and is held raised above the ground. Finger 36 is also disposed a suitable distance above the ground. When the lever 24 is actuated by cable 18 into the position shown in dot-and-dash lines in Figure 3, the forward end 29 of arm 30 is released and drops down and digs itself slightly into the soil.

As the harrow continues to move forwardly, this end 29 is thus held stationary and acts as a fulcrum for the arm 30 so that the pivoted end thereof moves upwardly in an arc, thereby raising the rear end of said angle member 19. This causes the entire harrow section to assume a rearwardly inclined position as shown in dot-and-dash lines in Figure 2. In this manner the teeth or spikes 14 are raised off the ground out of contact with the accumulated trash and at the same time the harrow continues to move forwardly so that when the harrow is lowered again to its normal position the teeth are brought in contact with the soil surface past said accumulated trash which is thus left behind.

After the arm 30 moves past the position shown in dot-and-dash lines in Figure 2, a suitable distance, the weight of the harrow and the angles 19 causes these to drop, thereby freeing the end 29 and causing the arm to drop into a position shown in full lines in Figure 8. However, in this position the harrow and the angles 19 are still elevated, being supported in raised position by finger 34. As the harrow continues to move forwardly the next finger 35 is brought against the ground, thereby raising the arm 30 as shown in dot-and-dash lines in Figure 8.

During the continued forward movement of the harrow, arm 30 is raised as shown in dot-and-dash lines in Figure 9, and as the finger 35 leaves the ground the finger 36 is brought into contact therewith as shown in full lines in Figure 9. As the axis 31 of the arm moves forwardly with the harrow, arm 30 is overbalanced and drops forward into its normal position, whereupon its end 29 again rests on the end 28 of arm 24 and with the finger 36 raised off the ground.

The jar produced when the harrow and angles 19 drop from the high position shown in dot-and-dash lines in Figure 2 to the position shown in full lines in Figure 8, helps to release any material that may cling to the harrow teeth. It will be noted that the harrow teeth formed by the rear half of the harrow section remain raised off the ground during the time fingers 34, 35 and 36 are successively brought into contact with the ground, thereby preventing said teeth from engaging the material released by the teeth of the forward half of the harrow section. Thus after each tripping operation the harrow teeth are brought into contact with the soil after the space containing the released trash has been bridged or skipped over.

The form disclosed in Figures 1 to 9 is shown as being detachably applied to a harrow section.

In the form shown in Figure 10 the tripping mechanism is shown built into the harrow section. In this form the intermediate longitudinal bar 11a is extended rearwardly past the harrow section and forms one member of a pair of bars 19a used for mounting the tripping device. The other member 19a is formed with apertures for receiving the rear tooth bars 12a and 12b and has its forward or inner end secured to the intermediate bar 11a.

Arm 30 is preferably provided at its forward end 29 with a forwardly and laterally projecting hump or protuberance 29a. The purpose of this hump 29a is to prevent said end 29 from entering the soil beyond a certain depth. In sandy soils the end 29 is liable to dig deep into the soil and interfere with the operation of the tripper without the provision of this hump.

In the form shown in Figure 11, a tripping member 27 is shown which is formed in the shape of a cam pivotally mounted at 38 and having its forward end terminating in a tooth 39 resting on the end 28 and adapted to dig into the ground when the arm 24 is released. The contour of this member 37 is such as to maintain it in contact with the soil when the member is released so as to cause said member to complete its cycle of movement of each tripping operation. The periphery of this member can be provided with one or more teeth or protuberances 40 similar to humps 29a of arm 29.

The lever 24 can be held against excessive forward movement in any suitable manner. As shown in the drawings it may be provided with an outwardly projecting finger 24b adapted to strike the edge of the plate 22 and form a stop for said lever as shown in Figure 3.

Each harrow section is provided with the tripping device 17 and the cable 18 so that each harrow section can be tripped or cleaned of the trash independently of the others.

My harrow raising and tripping device is of rugged construction so as to withstand hard usage in the field. It can be easily operated and it contains few parts so that the danger of getting out of order is reduced to minimum; it can be manufactured at low cost, and can be easily attached to existing harrows.

While I have shown and described herein the preferred forms of my invention, it is obvious that other changes in the construction of my tripping device can be made without departing from the spirit of my invention.

I claim:

1. In a harrow tripping device, the combination with a harrow having a series of spaced transverse tooth bars, of a support extending longitudinally and rearwardly of said harrow, means for detachably securing the forward end of said support to one of the intermediate tooth bars, a member fixed to said support and having a rearwardly presented L-shaped lower end detachably engaging the last of said tooth bars, whereby the operating stress between said support and said harrow is transmitted through said member, an elongated member revolubly mounted on the rear end of said support and extending forwardly, means for engaging said member and holding it out of contact with the ground, manually operable connections for operating said means to release said member and allow the forward end thereof to drop to the ground, whereby the forward movement of the harrow causes said support and rear end of said harrow to raise with the axis of said elongated member moving in an upward and forward arc over said forward end thereof, and means fixed to said elongated member and disposed above in spaced relation with the axis thereof and adapted to engage the ground when said member is in upsidedown position and restore it to normal raised position.

2. In a harrow tripping device of the class described, the combination with a harrow having a series of spaced transverse tooth bars, of a support extending rearwardly from said harrow, a U-shaped bolt detachably securing the forward end of said support to one of said intermediate tooth bars, a member secured to the underside of said support in spaced relation with the forward end thereof, said member being formed with a rearwardly and horizontally presented seat for receiving one of said tooth bars, whereby the operating stress between said harrow and said support is transmitted through said member, an elongated tripper pivotally mounted on the rear end of said support and extending forwardly thereof, means for engaging the forward end of said tripper and holding it out of contact with the ground, said means being operable to release said forward end to allow it to drop to the ground, whereby the pivotal end of said tripper is raised and moves in an arc over said ground engaging end, thereby raising said support and said harrow from the ground to clear the trash accumulated in the harrow, and means on said tripper and spaced relatively to the fulcrum thereof for engaging the ground and restoring said tripper to normal raised position upon the completion of the raising movement thereof.

3. In a harrow tripping device of the class described, the combination with a harrow having a series of transversely spaced tooth bars, of a support extending rearwardly from said harrow, a U-shaped bolt detachably securing the forward end of said support to one of said tooth bars, a plate fixed to the underside of said support near the last of said tooth bars, said plate having a vertically and rearwardly disposed shoulder for engaging the forward side of said tooth bar, and a horizontally and rearwardly disposed flange spaced from said support for engaging the underside of said tooth bar whereby the operating stress between said harrow and said support is transmitted through said plate, a tripper member pivotally mounted on the rear end of said support and extending forwardly thereof, means for engaging said tripper member to hold the forward end thereof out of contact with the ground, said means being operable to release said member and allow the forward end thereof to drop into engagement with the ground, whereby said tripper member swings upwardly and forwardly about its forward end, thereby raising said support and said harrow off the ground, and a plurality of short arms spaced from each other and extending upwardly from the pivotal end of said tripper member for engaging the ground and restoring said tripper member to normal position after each raising operation.

4. In a harrow tripping device of the class described, the combination of a support adapted to be attached to a harrow and extend rearwardly thereof, a cam-shaped member revolubly mounted on the rear end of said support and having an extended forward end adapted to drop and engage the ground, means for engaging said cam member and holding the forward end thereof out of contact with the ground, and manually operable connections for actuating said means to release said cam member, whereby during the first half of the revolution of said cam member said support and said harrow are raised off the ground and during the last half of the revolution the peripheral face of the upper half of said cam member is in engagement with the ground and restores said cam member to its normal raised position.

5. In a harrow tripping device of the class described, the combination of a support adapted to be attached to a harrow and extend rearwardly thereof, a cam-shaped member revolubly mounted on the rear end of said support and having an extended forward end adapted to drop and engage the ground, means for engaging said cam member and holding the forward end thereof out of contact with the ground, manually operable connections for actuating said means to release said cam member, whereby during the first half of the revolution of said cam member said support and said harrow are raised off the ground and during the last half of the revolution the peripheral face of the upper half of said cam member is in engagement with the ground and restores said cam member to its normal raised position, and a peripheral enlargement on the forward end of said cam member for limiting the entry of said forward end into the ground.

6. In a harrow tripping device of the class described, a support adapted to be attached to a harrow, a cam-shaped member revolubly mounted on said support and having an elongated forward end extending toward said harrow, means on said support for engaging said cam member and holding the forward end thereof out of contact with the ground, manually operable connections for actuating said means for releasing said cam member whereby the forward end thereof drops onto the ground and causes the rear end of said support to be raised in passing over said forward end, said cam member occupying a reverse position upon the completion of the first half of cycle of movement, the peripheral face of the upper half of said cam member engaging the ground and causing said cam member to move upward on its axis and resume its normal position.

AUGUST H. FINCK,